Oct. 14, 1941. R. W. BENSON 2,259,018
DECOY DUCK
Filed Jan. 17, 1941
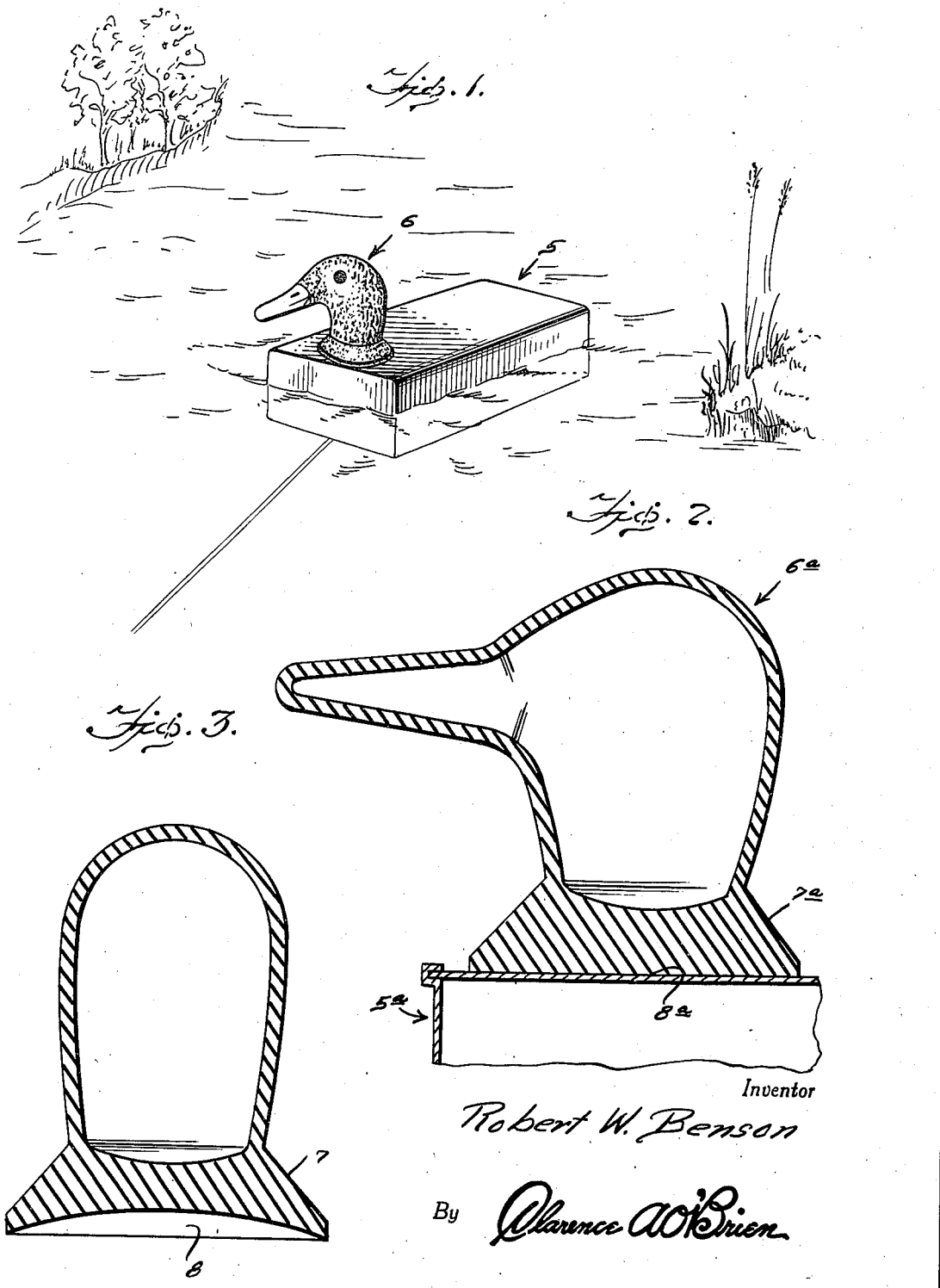
Inventor
Robert W. Benson
By Clarence A. O'Brien
Attorney Patented Oct. 14, 1941

2,259,018

UNITED STATES PATENT OFFICE 2,259,018

DECOY DUCK

Robert W. Benson, Orion, Ill.

Application January 17, 1941, Serial No. 374,937

1 Claim. (Cl. 43—3)

My invention relates to improvements in decoy ducks, and the primary object of the invention is to provide a simple and effective low cost substitute for the ordinary molded or wooden decoy ducks of the more expensive type.

Other important objects and advantages of my invention will be apparent from a reading of the following description taken in connection with the appended drawing, wherein for purposes of illustration I have shown preferred embodiments of my invention.

In the drawing:

Figure 1 is a general perspective view showing an embodiment of the invention in use.

Figure 2 is a longitudinal vertical sectional view of the invention in which the head of the decoy duck is cemented or otherwise secured to a tin can or the like forming the body of the duck.

Figure 3 is an enlarged transverse vertical sectional view taken through another embodiment of the invention in which the head of the decoy duck is secured to the body of the duck by means of a vacuum cup.

Referring in detail to the drawing, the principal presently contemplated forms of the invention comprise a rectangular block of wood or other floatable material such as shown in Figure 1 designated by the numeral 5, or a tin can 5a shown in Figure 2 to which the heads 6 and 6a, respectively, are attached. The bodies 5 and 5a are of inexpensive form and material so that they may be left at the blind or hunting site without great risk of loss through thievery which is common in the case of the more expensive molded or wooden decoy ducks, and the heads removed and taken away by the hunter.

These provisions make it possible for the hunter to take along with him the valuable portions of the decoy ducks without being subjected to the weight and bulk of the regular decoy ducks, which make them difficult to transport and store.

The heads 6 and 6a are preferably made of compressible and molded rubber formed on respective bases 7 and 7a, the heads proper being of desired shape and having desired coloring to resemble the heads of different types and species of ducks.

The base of the form of the invention shown in Figure 3 is beveled and circular in form and is provided with a concavity 8 in its bottom to provide a vacuum cup formation which enables removably applying the head to the block 5 or to the can 5a, so that the head is securely mounted in place during the service of the decoy, yet is readily removable to be carried away by the hunter, with the bodies 5 and 5a being left behind.

In the form of the invention shown in Figure 2, the base 7a has a flat plain under-surface 8a which is adapted to be cemented or otherwise suitably secured in an inexpensive and easily removable manner to the top of the block 5 or to the top of the can 5a, for the purposes already indicated.

Although I have shown and described herein preferred embodiments of my invention, it is to be definitely understood that I do not wish to limit the application of the invention thereto, except as may be required by the scope of the subjoined claim.

Having described the invention, what is claimed as new is:

For use as a decoy duck, a duck head adapted to be removably secured to any type of floatable body, said duck head comprising a hollow head portion simulating a duck's head and an integrally formed base portion, said base portion being bevelled and circular in form and having a concavity and of a material to provide a vacuum cup.

ROBERT W. BENSON.